United States Patent [19]

Richards

[11] Patent Number: 4,652,039
[45] Date of Patent: Mar. 24, 1987

[54] WINDSHIELD SHADE

[75] Inventor: Roger H. Richards, Arlington, Tex.

[73] Assignee: R. H. Richards Mfg., Inc., Irving, Tex.

[21] Appl. No.: 795,475

[22] Filed: Nov. 5, 1985

[51] Int. Cl.$^4$ .............................................. B60J 1/20
[52] U.S. Cl. ............................... 296/97 R; 296/97 E; 160/84 R; 160/229 R
[58] Field of Search ................. 296/97 R, 97 C, 97 E; 160/84 R, DIG. 2, DIG. 3, 107, 229 R

[56] References Cited

U.S. PATENT DOCUMENTS

| | | | |
|---|---|---|---|
| 2,690,928 | 10/1954 | Boynes | 296/95 |
| 3,411,562 | 11/1968 | Garrett | 160/327 |
| 3,454,300 | 7/1969 | Pugsley et al. | 296/95 |
| 3,751,100 | 8/1973 | Keyes | 296/95 C |
| 3,880,461 | 4/1975 | Flanagan | 296/95 C |
| 3,923,339 | 12/1975 | McDonald | 296/95 R |
| 4,109,957 | 8/1978 | Polizzi et al. | 296/95 C |
| 4,202,396 | 5/1980 | Levy | 296/97 R |
| 4,261,649 | 4/1981 | Richard | 350/276 R |

Primary Examiner—Robert R. Song
Attorney, Agent, or Firm—H. Dennis Kelly

[57] ABSTRACT

A windshield shade, made of a generally rectangular piece of material, having a top, a bottom, and two sides. The shade is foldable, in accordion style, along a plurality of fold lines, which extend from the top to the bottom of the shade, and the shade can be secured in the folded configuration. The shade also has perforations, extending across the shade from one side to the other, so that the height of the shade can be adjusted. A section of the material is cut out of the top, so that the shade will not contact the rear view mirror of the vehicle. The shade may also have a thumb hole near each side of the shade, to make handling of the shade easier. The top of the shade is a straight line, except where the section is cut out for the rear view mirror, and the bottom of the shade is cut so that the fold lines which are closer to the windshield are slightly longer than the other fold lines.

6 Claims, 3 Drawing Figures

WINDSHIELD SHADE

BACKGROUND OF THE INVENTION

1. Field of the Invention:

This invention relates to temporary sun shades, designed to be placed in the windshield of a parked vehicle.

2. Description of the Prior Art:

When a vehicle is parked in an open parking lot, the sun may shine through the windshield for long period of time. Excessive heat may build up inside the vehicle compartment. The temperature inside a closed vehicle compartment may get high enough to melt articles left in the compartment. The dashboard may crack, and the steering wheel may become too hot to touch.

U.S. Pat. No. 3,880,461 (Flanagan), issued Apr. 29, 1975, covers a heat reflective device consisting of lightweight sturdy composition board, faced on one side with a non-glare reflective material. This device may be placed inside and against the windshield of the vehicle, to reflect the sun's rays. The device has a pair of fold out legs, so that the device can rest on the dashboard of the vehicle.

Another shade has been designed to rest on the dashboard of the vehicle, held in place by the vehicle's own visors. This shade is generally rectangular, to fit the inside of the windshield. The shade is also foldable, in accordion style, so that the shade can stored easily when not in use.

SUMMARY OF THE INVENTION

The windshield shade of the invention is a generally rectangular piece of material, having a top, a bottom, and two sides. The shade rests on the dashboard of a typical vehicle and substantially cover the inner surface of the windshield. The shade is foldable, in accordion style, along a plurality of fold lines, which extend from the top of the shade to the bottom. A section of the top of the shade is cut out, so that the shade will not contact the rear view mirror of the vehicle. The remainder of the top of the shade is a straight line. The bottom of the shade is cut so that every other fold line is slightly shorter than the other fold lines.

The shade can be unfolded and placed on the dashboard of the vehicle, inside the windshield. The visors of the vehicle are then folded down to hold the top of the shade against the windshield. The fold lines which are closer to the windshield are longer than the other fold lines, so that the bottom of the shade will fit more closely across the dashboard as the top of the shade leans against the visors.

DESCRIPTION OF THE PREFERRED EMBODIMET

Figure 1:
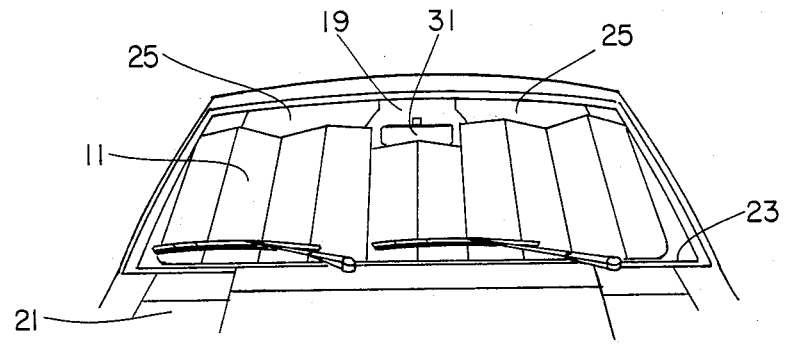
FIG. 1 is a perspective view of a vehicle with a windshield shade in place.
Figure 2:
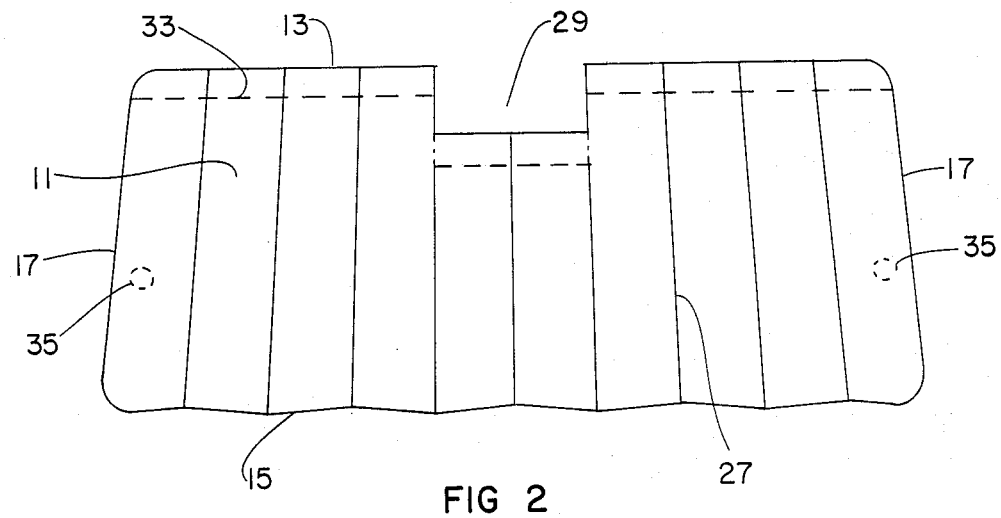
FIG. 2 is a elevational view of the shade, unfolded and laid out flat.

The windshield shade 11 of the invention is a generally rectangular piece of material, having a top 13, a bottom 15, and two sides 17. Many different types of material are suitable, but the material is preferably lightweight and opaque, such as cardboard or plastic. The shade 11 is sized to fit on the dashboard, within the windshield 19, of a typical vehicle 21. The bottom 15 of the shade 11 rests on the dashboard 23 of the vehicle 21, and the top 13 of the shade 11 is held in place by the visors 25 of the vehicle 21. The rectangular shade 11 will then substantially cover the inner surface of the windshield 19.

The shade 11 is foldable, in accordion style, along a plurality of fold lines 27. The fold lines 27 extend from the top 13 of the shade 11 to the bottom 15.

A rectangular section 29 of material is cut out of the top 13 of the shade 11. This cut-out section 29 makes it possible to place the shade 11 on the dashboard 23 without hitting the rearview mirror 31.

The shade 11 also has perforations 33, which extend across the shade 11 from one side 17 to the other. This allows the height of the shade 11 to be adjusted, if desired. If the windshield 19 of the vehicle 21 is too short to accommodate the shade 11, the shade 11 can be torn along the perforations 33, so that the shade 11 will fit properly.

Except for the cut-out section 29, the top 13 of the shade 11 is cut in a straight line. The bottom 15 of the shade is cut so that every other fold line 27 is shorter than the other fold lines 27. The fold lines which are closer to the windshield 19, when the shade 11 is in place, are slightly longer than the other fold lines 27. For example, if the other fold lines 27 are 22 inches long, then the slightly longer fold lines 27 will be about 22½ inches long. Therefore, as the top 13 of the shade 11 leans against the visors 25, the bottom 15 of the shade 11 will fit more closely along the dashboard 23.

The shade 11 may have perforated thumb holes 35 near each side 17 of the shade 11. If desired, the thumb holes 35 can be punched out, so that the shade 11 may be more easily handled.

Figure 3:
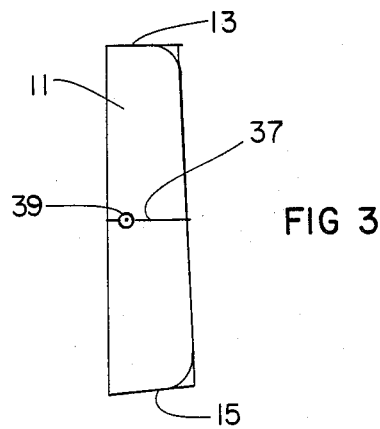
FIG. 3 is a elevational view of the shade in the folded configuration.

As shown in FIG. 3, the shade 11 also may have means for securing the shade 11 in the folded configuration. In the preferred embodiment, this means is a string 37, which can be wrapped around the shade 11 and secured around a tab 39.

The windshield shade of the invention has several advantages over the prior art. The novel shape of the shade, in particular the bottom 15, allows the shade to more closely conform to the windshield 19, particularly across the bottom 15. Therefore, the shade 11 is less likely to allow light to shine through gaps in the bottom 15 of the shade 11. The perforations 33 allow the shade 11 to be adjusted to fit shorter windshields 19. The optional thumb holes 35 allow the shade 11 to be more easily handled.

I claim:

1. A windshield shade, comprising:
   a generally retangular piece of material, having a top, a bottom, and two sides, so that the shade will sit on a dashboard of a typical vehicle and substantially cover the inner surface of a windshield;
   wherein a section of the material is cut out of the top, so that the shade will not contact a rearview mirror;
   wherein the shade is foldable, in accordion style, along a plurality of fold lines, which extend from the top to the bottom of the shade;
   wherein the top of the shade is a straight line, except where the section is cut out for the rearview mirror; and wherein the bottom of the shade is cut so that every other fold line is slightly shorter than the other fold lines, so that the bottom of the shade will fit closely along the dashboard.

2. A windshield shade, as recited in claim 1, wherein the shade has perforations, extending across the shade from one side to the other, so that the height of the shade can be adjusted if desired.

3. A windshield shade, as recited in claim 1, wherein the shade has a thumbhole near each side of the shade.

4. A windshield shade, as recited in claim 1, further comprising means for securing the shade in the folded configuration.

5. A windshield shade, comprising:
a generally rectangular piece of material, having a top, a bottom, and two sides, so that the shade will sit on a dashboard of a typical vehicle and substantially cover the inner surface of a windshield;
wherein the shade is foldable, in accordion style, along a plurality of fold lines, which extend from the top to the bottom of the shade, so that every other fold line is closer to the windshield; and
means for securing the shade in the folded configuration;
wherein the shade has perforations, extending across the shade from one side to the other, so that the height of the shade can be adjusted if desired;
wherein a section of the material is cut out of the top, so that the shade will not contact a rearview mirror;
wherein the shade has a thumbhole near each side of the shade;
wherein the top of the shade is a straight line, except where the section is cut out for the rearview mirror; and
wherein the bottom of the shade is cut so that the fold lines which are closer to the windshield are 22½ inches long, and the fold lines which are further from the windshield are 22 inches long, so that the bottom of the shade will fit closely along the dashboard.

6. A windshield shade, comprising:
a generally rectangular piece of material, having a top, a bottom, and two sides, so that the shade will sit on a dashboard of a typical vehicle and substantially cover the inner surface of a windshield;
wherein the shade is foldable, in accordion style, along a plurality of fold lines, which extend from the top to the bottom of the shade, so that every other fold line is closer to the windshield;
wherein the top of the shade is substantially a straight line; and
wherein the bottom of the shade is cut so that the fold lines which are closer to the windshield are slightly longer than the other fold lines, so that the bottom of the shade will fit closely along the dashboard.

* * * * *